July 17, 1923.

R. KYSELA 1,461,917

MOTOR CONTROL MEANS AND SYSTEM AND METHOD

Filed July 20, 1921

INVENTOR,
Rudolph Kysela;
BY Raymond Ives Blakeslee,
ATTORNEY

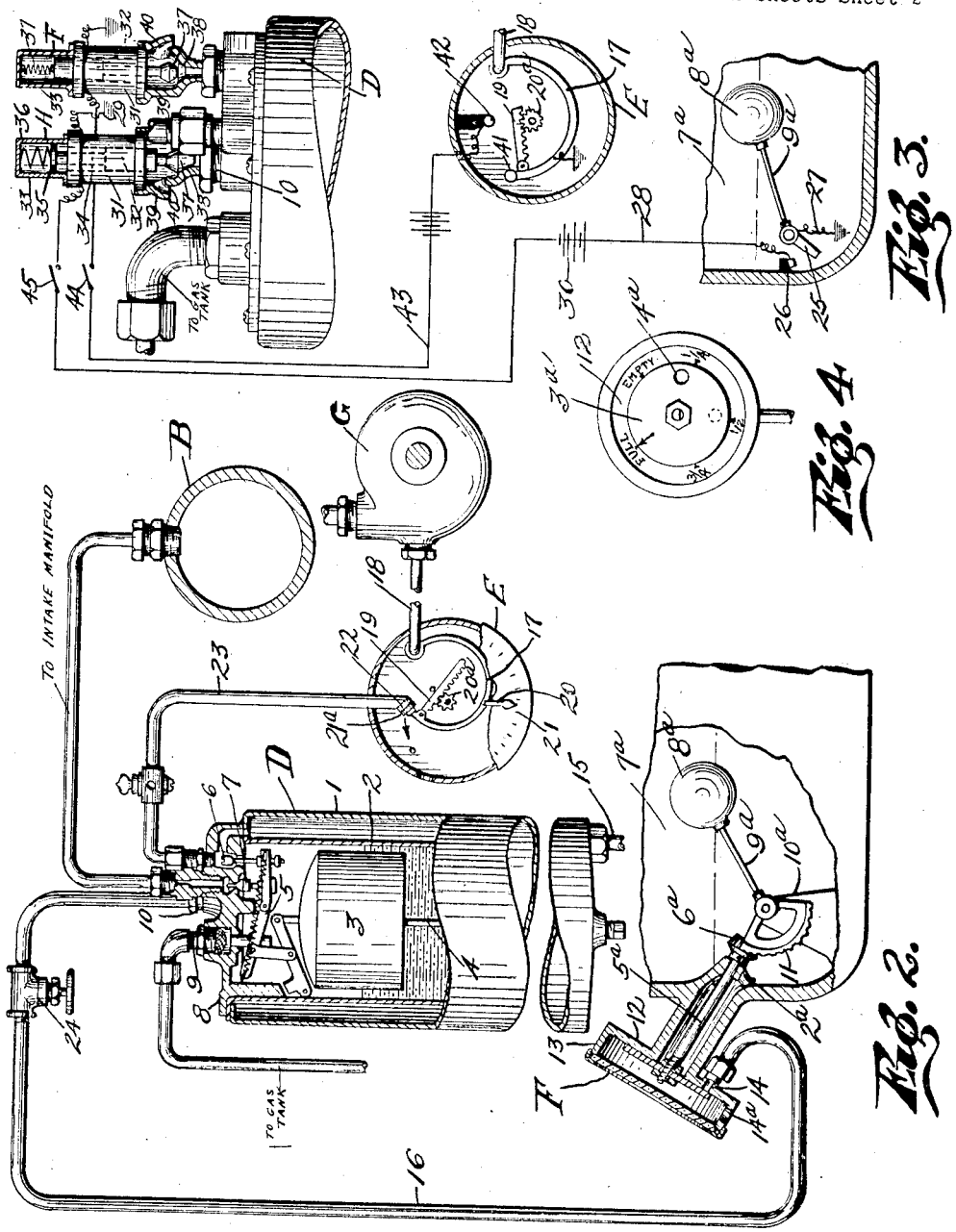

Patented July 17, 1923.

1,461,917

UNITED STATES PATENT OFFICE.

RUDOLPH KYSELA, OF LOS ANGELES, CALIFORNIA, ASSIGNOR OF ONE-HALF TO LEO V. STARR, OF LOS ANGELES, CALIFORNIA.

MOTOR-CONTROL MEANS AND SYSTEM AND METHOD.

Application filed July 20, 1921. Serial No. 486,198.

*To all whom it may concern:*

Be it known that I, RUDOLPH KYSELA, a citizen of the United States, residing at Los Angeles, in the county of Los Angeles and State of California, have invented new and useful Improvements in Motor-Control Means and Systems and Methods, of which the following is a specification.

This invention relates to a motor control means and system and method, and has for an object a prevention of excessive friction and wear of the various parts through the lack of proper oiling. A further object is to stop the engine of the motor vehicle from running when the oil level becomes too low, thus giving a warning to the motorist that he should replenish his oil.

In practising the invention, I provide a system adapted for use with a wellknown make of vacuum system, which system automatically renders the vacuum system inoperative so that fuel adapted to run the engine will be shut off after a given time, thus giving a warning to the motorist that the oil in the crank case is at a low point, or that the oil pump is not operating. My system contemplates a special form of dial adapted to move in conjunction with the oil indicator gauge, which dial in turn acts in conjunction with means which will atmospherize the interior of the vacuum system so that the said vacuum system will simply draw air in place of gasoline from the gas tank. As a result, when the gasoline is exhausted from the tank of the vacuum system to the engine carbureter, the engine will stop running. The second safety provision lies in the connection with the oil pump, of an oil indicator which operates mechanism operating in conjunction with the air vent of the vacuum system. When the oil pump ceases operation, the air vent is automatically closed, and as a result a vacuum will be caused within the tank of the vacuum system which will tend to either flood the tank of the vacuum system with gasoline or prevent discharge of gasoline from said vacuum system and hence stop the operation of the engine of the vehicle through lack of fuel.

It is perhaps unnecessary to state at length or in detail the dangers of running an engine or the working parts of a motor vehicle without oil. When metallic members rub together heat is generated and the walls of the members are scratched, abraded and badly cut. An engine cylinder with a piston reciprocating therein without lubrication means will become very hot so that any oil that may be splashed on its outside will be burned. Running an engine without oil will produce a metallic knock and the heat generated will finally cause the piston to stick in the cylinder. The engine will be ruined and the cylinder so badly scored that the compression of the engine will not hold. It will thus follow that some method should be provided which is absolutely "fool proof", and which will operate at the proper time and will not operate simply because the oil level in the crank case is being thrown violently back and forth, due to jostling of the automobile vehicle itself. Obviously, a system that would operate due to violent jar of the vehicle would be useless and the particular system of this invention is so arranged as to overcome this fault.

After a motor of a vehicle equipped with this system has stopped running, the operator may know that either the oil pump is not working or the oil level is very low. If the oil pump is not working it should immediately be remedied, and if it is impossible to remedy it, a particular form of two-way cock is provided so that the air vent of the vacuum system may be opened, as before. The automobilist in this case should immediately determine where the nearest garage is and should preferably have his car towed to said garage rather than take the chance of ruining the engine or its working parts. In case the oil level is simply reaching the danger mark, a cock arranged on the air-bleeding line may be shut off so that the vacuum might be maintained within the vacuum system tank, and the driver would then determine the nearest garage or oil supply station and have the oil in his crank case replenished. The gauge is adapted to give an alarm at a point sufficient to allow a man to run at least four or five miles without any damage to the engine through lack of lubrication.

The invention has for further objects the provision of an improved system of the character described, which will be superior in the point of relative simplicity and inexpensiveness taken in conjunction with utility, durability, general efficiency and serviceability.

With the above mentioned and other objects in view, the invention consists in the novel and useful provision, formation, construction, combination, association and inter-relation of parts, members and features as illustrated in some of its embodiments in the accompanying drawings described in the following detailed description and finally pointed out with particularity in the claims.

In the drawings:

Figure 2 is a diagrammatic view, certain parts being sectioned, of my improved motor control means, and showing the various arrangements of the working parts used in conjunction with the intake manifold of an engine, as well as with a vacuum system;

Figure 3 shows the system shown in Figure 2 but operated by electrical means; and Figure 4 illustrates a particular form of indicator dial for the crank case to indicate the oil level therein.

Corresponding parts in all the Figures are designated by the same reference characters.

Figure 1:
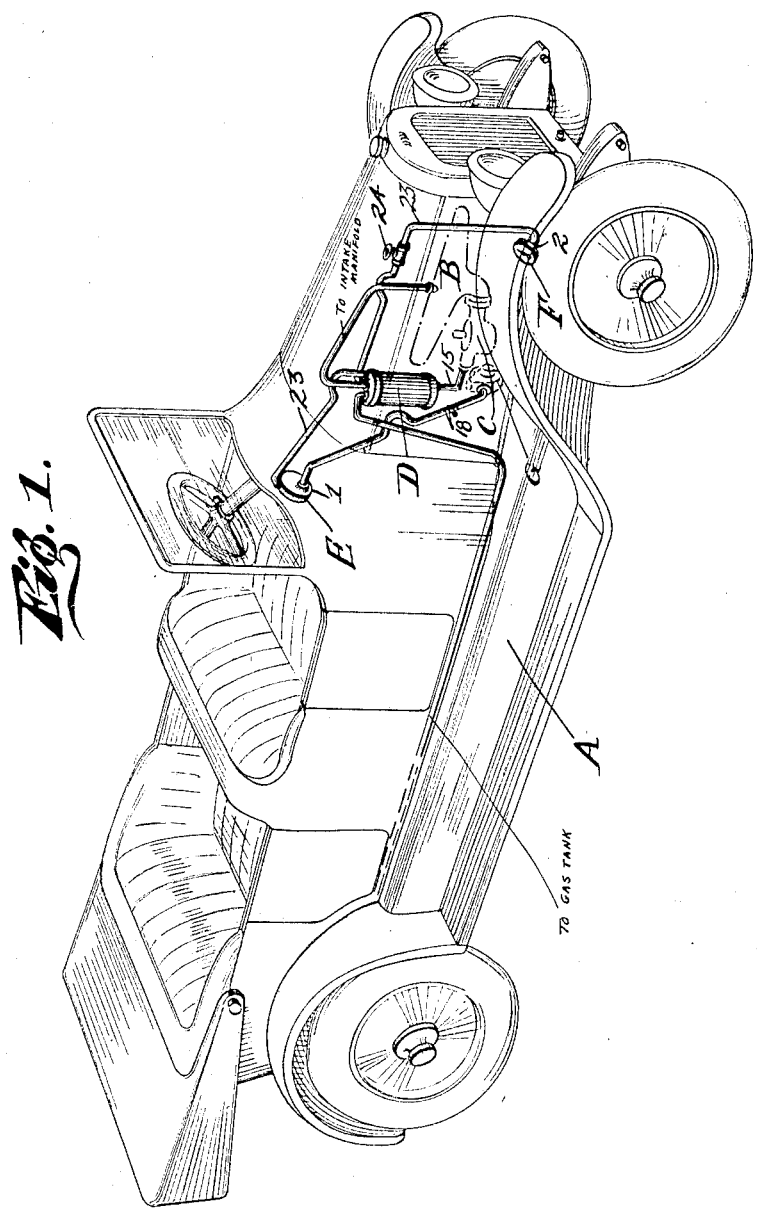
Figure 1 is a perspective view illustrating my improved motor control means and system and method in conjunction with a motor vehicle.

Referring with particularity to the drawings, I have designated the motor vehicle in its entirety as A; the intake manifold of the engine carried by said motor vehicle as B; the carbureter as C; and the vacuum system as D, all of which elements are used in practicing one embodiment of my invention. A gauge E for indicating the oil pressure is ordinarily placed on the dashboard of a motor vehicle, as shown at 1ª. A second gauge F is located and extends from the crank case of an internal combustion engine, as indicated at 2ª. The gauge F incorporates in one embodiment of my invention a particular form of construction, which construction is illustrated in Figure 4. In place of the ordinary pointer adapted to pass over a series of graduations, I provide a disc 3ª, taking the place of said pointer, and which disc is provided with a perforation 4ª. The said disc is joined with a stem 5ª, carrying a beveled gear 6ª within the crank case 7ª, said beveled gear in turn is actuated by means of a cork or ball float 8ª adapted to ride on the oil surface of oil contained within the crank case, and which ball is provided with a stem 9ª, having pivotal engagement with a standard 10ª and a segment gear 11 joined with the boss surrounding its pivot point, which segment actuates or moves the beveled gear 6ª.

The usual indicator casing 12 is provided, which indicator casing is formed with an annular flange 13, thus forming a chamber. The base portion of said indicator casing 12 has marked thereon various indications as ¼, ½, ¾, as shown in Figure 4. The dial 3ª is adapted to have a close engagement with the base of the casing 12, and a pointer marked on said indicator will show the amount of oil within the crank case as the indicator is rotated by movement of the float 8ª. The base 12 is perforated at a given point as indicated at 14 and the flange is perforated at 14ª. The perforation 4ª and the perforation 14 will come in conjunction with each other at a definite point in the rotation of the indicator dial 3ª when the oil level becomes dangerously low.

In Figure 2 I have illustrated a well-known make of vacuum system and in which 1 is an outer casing or lower chamber; 2 the inner casing or upper chamber; 3 a float within the chamber 2; 4 a stem joined with said float for guiding the same and for operating a series of levers; 5 a toggle lever; and 6 and 7 valve members. In this form of vacuum system the cover 8 is provided with four openings with parts associated therewith, one of which as 9 has a pipe received within said opening and communicating with a gasoline tank. A second opening leading to the interior of the upper chamber 2, as indicated at 10, ordinarily has a filler plug received within said opening. The next two openings have the valve actuating means 6 and 7 received the same for opening and closing said openings. The valve 7 controls the vacuumizing and the valve 6 connects with the air vent. The operation of this system may be briefly described as follows: Assuming that there is no gasoline in either chamber included within the chambers 1 or 2, the float and the toggle lever 5, to which the float is connected, will operate so as to close the valve 6, which will prevent the admittance of air into the vacuum chamber or the upper chamber 2, and at the same time open the valve 7 connected with the vacuum pipe leading to the intake manifold B. It is a known fact that suction takes place in the intake manifold when the pistons of an engine are working and this suction is utilized in this particular form of system. Assuming that the engine is running either under its own power or through spinning the same, a vacuum is then created in the upper chamber within the inner casing 2, which will close a valve, not shown in the drawing, which is associated with a port communicating from the casing 2 to the interior of the casing 1, thereby making the upper chamber air tight, which creates a vacuum and causes gasoline to be drawn from the gasoline tank to the vacuum or upper chamber through the opening 9. As the gasoline enters the upper or vacuum chamber, the float 3 will rise and will operate the toggle lever 5, so that the valve 7 leading to the intake manifold, will be closed, thereby cutting off further suction and at the same time the valve 6 will be opened, which opening will permit air to enter the vacuum chamber or the outer chamber through the air vent. Air entering the vacuum chamber will cause the valve located on the bottom wall of the casing 2, which valve controls the admission of gasoline from the chamber 2 to the interior of the casing 1, to open and this opening will permit the gasoline to flow into the lower chamber or gravity tank, thereby causing the float 3 to lower as the gasoline flows out. This gasoline will pass through an opening in the bottom wall of the casing 1 through a pipe 15 to the carbureter C connected with the intake manifold of the engine. After the float lowers the toggle lever 5 again acts, and the valve 7 will open and the valve 6 close, which action will cause the valve communicating between the vacuum chamber and the gravity feed tank to again close and the vacuum and suction take place over again. Special attention is called to the fact that the lower chamber, or the gravity feed tank, is always open to air circulation in this particular form of system through an air vent, otherwise the gasoline would not flow by gravity to the carbureter.

In my system I make use of the vacuum system D just described, and incorporate my system with the valve 6 and with the opening leading to the interior of the vacuum chamber, which is ordinarily closed by a plug. A conduit or pipe 16 is joined to the oil gauge base 12 of the gauge F, and communicates with the perforation 14, while the opposite end of said pipe 16 is joined to and communicates with the opening 10, which opening ordinarily receives a plug.

In place of the air vent pipe ordinarily associated with this form of vacuum system, I have a pipe communicating with the port ordinarily carrying the air vent pipe, which pipe leads to the gauge E. The gauge E is of the expansion type and consists of a tube 17 within the indicator casing, and which tube is adapted to be expanded or straightened through an increase of pressure from the oil pump G. It is to be noted that there is a connection between said tube 17 and the oil pump G, as indicated at 18. As the tube 17 expands, the same actuates a rack 19, which rack plays over a pinion 20ª which pinion is mounted on a shaft adapted to rotate a pointer 20 over a series of graduations on a dial 21. Thus the pressure of oil is at all times indicated by the play of the pointer over the graduations. The end of the pipe 23 is provided with a port having a seat 22 with which the plug 21ª cooperates.

Now, assuming two conditions: First, that the oil level is reaching a dangerously low point, the float 8ª will gradually sink and as it does so the shaft 5ª will be so rotated that the perforation 4ª will come into conjunction with the opening 14, which will cause an atmospheric condition to exist within the vacuum chamber of the means D. This will, of course, break the vacuum within the chamber 2 and will not permit the system to draw more gasoline from the gas tank within said vacuum chamber. As a consequence, whatever gasoline is already within the vacuum chamber will flow out through the valve at the bottom of the casing 2 into the chamber within the casing 1, or the gravity feed tank, to the carbureter, whereupon, after the gasoline has been exhausted the engine will stop running. The operator of the vehicle, or in case a vehicle is not used, the operator of the engine will immediately be able to locate the trouble as his oil pump gauge will be registering correctly and he will know from the oil level gauge that he must replenish his oil supply. If the operator is running a vehicle, he immediately knows that he must seek an oil station, and in order to render his vacuum system again operable, he closes a valve 24 located in the line 16. This valve cuts off the ingress of air into the vacuum chamber and allows the vacuum system to again become operative.

Assuming now, that the oil level is not low in the crank case but that the oil pump G is not operating properly, the expansion tube 17, which when the oil pump is operating properly exerts a pressure sufficient to cause it to expand, will gradually return to the position illustrated in Figure 2 because the oil pressure has dropped to zero, at which time the plug 21 will close the opening in the seat 22. As stated, the pipe 23 takes the place of the air vent pipe and consequently a shuting off of the air within the means D will not permit the means D to discharge gasoline therefrom. The vacuum will continue to draw gasoline within the vacuum chamber, but as the outer chamber and inner chamber are then not atmospherized, gasoline cannot be discharged from either chamber, and as a consequence the system "chokes." What gasoline is already within the carbureter C will feed the engine until the supply runs out and the engine of course stops. It will thus be seen that I have provided a positive system for indicating the oil level, as well as the condition of the oil pump, and one or both of which may operate either separately or jointly.

In Figure 3 I have illustrated a modification of the particular arrangement of the device shown in Figure 2 and in which figure I have illustrated an electrical means in place of the ordinary air system illustrated in Figure 2.

In the modification of Figure 3 I provide two electrically operated solenoids F and H. The solenoid F is received within the opening 6, which opening is normally occupied by the air vent tube. The solenoid H occupies the opening which is normally occupied by the plug. The solenoid H operates when the oil level within the crank case reaches a definite point. The float 8ª, as before, has a connecting stem 9ª pivotally supported within the crank case. A knife arm 25 is carried by the boss portion and said knife is adapted to engage a jaw or hinge post 26 when the ball float 8ª falls to a determined point. The stem 9ª likewise tends to rotate a shaft so that an indicator exterior the crank case may indicate the oil level therein. The knife 25 is grounded as shown at 27, through a suitable conductor and a conductor 28 leads from the hinge or jaw post 26 to one terminal of the solenoid H, while the other terminal of the solenoid is grounded as shown at 29. Interposed within the circuit 28 is a suitable source of current supply, such as batteries, 30.

The solenoid H includes in its structure the usual magnet 31 and movable core 32. The solenoid is provided with an extension cap 33. A stem portion 34 is joined with the movable core and has at its free end a flange 35. A coil spring 36 is received within the cap 33 and normally bears downwardly upon the flange 35. Likewise associated with the core 32 is a valve headed stem 37. This valve headed stem is received within a valve seat 38 under certain conditions. The valve headed stem is surrounded by a casing 39, having an opening 40 extended therethrough. The casing 39 is adapted to be screw threaded within the opening normally confining a plug. This opening, which is 10, is used for priming the vacuum tank with gasoline under normal conditions. The spring 36 maintains the valve headed stem so as to engage the valve seat and keep out air from the interior of the vacuum chamber. If, now, the oil level were to reach a low point, the knife 25 would engage the jaw post 26 and complete an electrical circuit which would result in the solenoid core 32 being drawn upwardly so that the valve head would be unseated. This would allow air to pass through the port or opening 40 and in this manner prevent gasoline from being drawn within the vacuum chamber.

The solenoid F is practically identical with the construction of a solenoid H with one exception and that is that a tension spring 37 normally holds the movable core 32 raised so that the valve headed stem does not engage its valve seat. As the solenoid F is screw-threaded within the opening normally occupied by the air vent tube it is of course essential that the valve head be open so as to allow air to pass through the port 40 into either the vacuum chamber or the gravity chamber. When the expansion coil 17 returns to a normal condition the head of same, as 41, will engage a contact 42 and complete an electrical circuit through the solenoid F, whereupon the movable core 32 will be drawn downwardly so that the valve head will engage its valve seat and prevent any air from entering into either the vacuum chamber or the gravity chamber. Obviously, when this occurs the suction will simply draw gasoline within the vacuum chamber but will not allow its distribution into the carbureter.

It will thus be seen that I have provided two methods of preventing an engine or its working parts from running without oil either because the oil is at a low level or due to oil pump trouble. A switch is interposed in each of the wire conductors 28 and 43, the switches being indicated as 44 and 45. The switches 44 and 45 take the place of the valve 24 and the two-way cock on the line 23 shown in Figure 2. Thus by turning said switches so that the current is shut off, it is possible to run the engine as before. In place of using batteries 30 in the circuits 28 and 43 it is preferable to connect said conductors 28 and 43 in series with the ignition circuit of an automobile; thus when the automobile or other vehicle is stopped the current will not be always passing through the solenoids. Obviously when the engine is spun the oil pump G will commence operation, whereupon the expansion coil 17 will move the point 41 from the point 42. This of course will happen providing the oil pump G is operating properly. The knife member 25 will not contact with the post 26 unless the oil is at a pre-determined low point, whereupon the solenoid H will immediately operate when the ignition circuit is placed in operation.

It is obvious that an invention of this character would be adaptable for many uses other than for automobiles, and I do not wish to be understood as confining it simply to an automobile, as it may be used in aeroplanes, tractors, and, in fact, anywhere where an internal combustion engine is used in connection with a vacuum system.

It is obvious that many changes and variations and modifications may be made in departure from the particular description and showing of the accompanying drawing, in adapting the invention to varying conditions and requirements of use and service, without departing from the true spirit of the invention.

Having thus disclosed my invention, what I claim and desire to secure by Letters Patent is:

1. The combination, with a vacuum system, and a lubrication system for an internal combustion engine; said vacuum system including a casing provided on its interior with a vacuum chamber and an outer supply chamber, there being a port through which the outer chamber and inner chamber may be atmospherized and a second port leading to the interior of said vacuum chamber; means being provided between said first-named port and lubrication system whereby when the oil pump of said system exerts no pressure therein, said port will be closed, shutting off entrance of air within said vacuum chamber and outer supply chamber, thereby preventing flow of fuel to the engine.

2. The combination, with a vacuum system, and a lubrication system for an internal combustion engine; said vacuum system including a casing provided on its interior with a vacuum chamber and an outer supply chamber, there being a port through which the outer chamber and inner chamber may be atmospherized and a second port leading to the interior of said vacuum chamber; means being provided between the lubrication system and said second named port whereby when the oil level of said lubrication system reaches a pre-determined point, the interior of said vacuum chamber will be atmospherized, thereby preventing liquid fuel from being drawn within said vacuum chamber; means being likewise provided between said first-named port and lubrication system whereby when the oil pump of said system exerts no pressure therein, said port will be closed, shutting off entrance of air within said vacuum chamber and outer supply chamber.

3. The combination, with liquid fuel supply means for an internal combustion motor, such supply means being operative in response to variations of atmospheric pressure, of a lubrication system for said motor, a gauge adapted to indicate the oil level of said lubrication system, and means controlled by said gauge for rendering said liquid fuel supply means inoperative; said gauge including a casing formed with a port, and a disc adapted to rotate within said casing for indicating the oil level of the librication system, said disc being formed with a perforation therein adapted to register with the port when the oil level reaches a determined point; said port being rendered air-tight previous to its registration with the perforation in the disc.

4. The combination, with a vacuum system and lubrication system for an internal combustion motor; said vacuum system including a member having an outer casing and an inner casing, of means for alternately vacuumizing and atmospherizing the interior of the inner casing, and for atmospherizing the interior of the outer casing; both said inner casing and outer casing being closed at their ends, there being a valve passage between said inner casing and said outer casing; means between the lubrication system and vacuum system adapted to prevent vacuumizing of the interior of the inner casing when the oil level of said lubrication system reaches a pre-determined point.

5. The combination, with a vacuum system and lubrication system for an internal combustion motor; said vacuum system including a member having an outer casing and an inner casing, of means for alternately vacuumizing and atmospherizing the interior of the inner casing, and for atmospherizing the interior of the outer casing; both said inner casing and outer casing being closed at their ends, there being a valve passage between said inner casing and said outer casing; means between the lubrication system and vacuum system adapted to prevent vacuumizing of the interior of the inner casing when the oil level of said lubrication system reaches a pre-determined point; and means likewise being included between the lubrication system and the means for atmospherizing said vacuum system adapted to prevent such atmospherization due to impairment of the oil pump of such lubrication system.

6. The combination, with a vacuum system and lubrication system for an internal combustion motor; said vacuum system including a member having an outer casing and an inner casing, of means for alternating vacuumizing and atmospherizing the interior of the inner casing, and for atmospherizing the interior of the outer casing; both said inner casing and outer casing being closed at their ends, there being a valve passage between said inner casing and said outer casing; means between the lubrication system and vacuum system adapted to prevent vacuumizing of the interior of the inner casing when the oil level of said lubrication system reaches a pre-determined point; and means likewise being included between the lubrication system and the means for atmospherizing said vacuum system adapted to prevent such atmospherization due to impairment of the oil pump of such lubrication system; there being means for restoring the vacuum system to a normal condition.

7. An apparatus for controlling the supply of liquid fuel to internal combusition engines in which a valve controlled by the librication system is interposed in a pipe through which an air supply is maintained in an auxiliary fuel supply receptacle, in such a manner that while the valve permits free communication of air to such auxiliary fuel supply when the lubricating oil system is normal, the valve is permitted to close the communication when the lubricating oil system fails.

In testimony whereof I have signed my name to this specification in the presence of two subscribing witnesses.

RUDOLPH KYSELA.

Witnesses:
J. SHUTT,
R. C. LINDHOLM.